(12) United States Patent
Suzuki (10) Patent No.: US 11,658,321 B2
(45) Date of Patent: May 23, 2023

(54) ENERGY MANAGEMENT METHOD, ENERGY MANAGEMENT APPARATUS, AND ENERGY MANAGEMENT SYSTEM

(71) Applicant: KYOCERA Corporation, Kyoto (JP)

(72) Inventor: Yuki Suzuki, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 554 days.

(21) Appl. No.: 16/498,457

(22) PCT Filed: Mar. 29, 2018

(86) PCT No.: PCT/JP2018/013294
§ 371 (c)(1),
(2) Date: Sep. 27, 2019

(87) PCT Pub. No.: WO2018/181731
PCT Pub. Date: Oct. 4, 2018

(65) Prior Publication Data
US 2020/0295391 A1 Sep. 17, 2020

(30) Foreign Application Priority Data

Mar. 29, 2017 (JP) .............................. JP2017-064450

(51) Int. Cl.
*H01M 8/04858* (2016.01)
*G05B 19/042* (2006.01)
(Continued)

(52) U.S. Cl.
CPC ...... *H01M 8/04932* (2013.01); *G05B 19/042* (2013.01); *H01M 8/04611* (2013.01); *H01M 8/04626* (2013.01); *H01M 8/04753* (2013.01); *H01M 10/425* (2013.01); *H01M 10/48* (2013.01); *H02J 7/35* (2013.01);
(Continued)

(58) Field of Classification Search
CPC ........ H01M 8/04932; H01M 8/04611; H01M 8/04626; H01M 8/04753; H01M 10/425; H01M 10/48; H01M 2010/4271; H01M 2220/10; H01M 2250/10; G05B 19/042;
(Continued)

(56) References Cited

U.S. PATENT DOCUMENTS 4,888,190 A * 12/1989 Hashimoto ............. A23L 27/50
426/589
2003/0113601 A1 * 6/2003 Edlund ............. H01M 8/04947
429/425
(Continued)

FOREIGN PATENT DOCUMENTS

JP 2002372199 A * 12/2002 ............. G05B 15/02
JP 200496839 A 3/2004
(Continued)

*Primary Examiner* — Thomas C Lee
*Assistant Examiner* — Charles Cai
(74) *Attorney, Agent, or Firm* — Hauptman Ham, LLP (57) ABSTRACT

An energy management method comprises a step A of outputting, by a fuel cell apparatus provided in each of a plurality of facilities, power using fuel, a step B of managing a storage amount of the fuel stored in a storage tank shared by the plurality of facilities, and a step C of allocating the storage amount of the fuel to each of the plurality of facilities.

15 Claims, 4 Drawing Sheets

(51) Int. Cl.
  *G06Q 50/06* (2012.01)
  *H01M 8/04537* (2016.01)
  *H01M 8/04746* (2016.01)
  *H01M 10/42* (2006.01)
  *H01M 10/48* (2006.01)
  *H02J 7/35* (2006.01)

(52) U.S. Cl.
  CPC ..... *G05B 2219/2639* (2013.01); *G06Q 50/06* (2013.01); *H01M 2010/4271* (2013.01); *H01M 2220/10* (2013.01); *H01M 2250/10* (2013.01)

(58) Field of Classification Search
  CPC ... G05B 2219/2639; H02J 7/35; G06Q 50/06; Y02E 60/10; Y02E 60/50

See application file for complete search history.

(56) References Cited

U.S. PATENT DOCUMENTS

| | | | | |
|---|---|---|---|---|
| 2004/0163806 | A1* | 8/2004 | Hadley | E21B 47/107 166/250.03 |
| 2013/0035802 | A1* | 2/2013 | Khaitan | G05B 15/02 700/297 |
| 2013/0096726 | A1* | 4/2013 | Lyren | G05B 13/026 700/291 |
| 2014/0316958 | A1* | 10/2014 | Alberth, Jr | G07F 15/005 705/35 |
| 2015/0255808 | A1* | 9/2015 | Nakamura | H01M 8/04007 429/442 |
| 2017/0012439 | A1* | 1/2017 | Zhang | H02J 3/50 |

FOREIGN PATENT DOCUMENTS

| | | | | |
|---|---|---|---|---|
| JP | 2004-355838 | A | 12/2004 | |
| JP | 2013176186 | A * | 9/2013 | ......... H02J 13/0006 |
| JP | 2016-152659 | A | 8/2016 | |
| JP | 2016180578 | A * | 10/2016 | |
| WO | 2013/125648 | A1 | 8/2013 | |

* cited by examiner

ENERGY MANAGEMENT METHOD, ENERGY MANAGEMENT APPARATUS, AND ENERGY MANAGEMENT SYSTEM

RELATED APPLICATIONS

The present application is a National Phase of International Application No. PCT/JP2018/013294, filed Mar. 29, 2018, and claims priority based on Japanese Patent Application No. 2017-064450, filed Mar. 29, 2017.

TECHNICAL FIELD

The present invention relates to an energy management method, an energy management apparatus, and an energy management system.

BACKGROUND ART

In the related art, a technology of controlling a fuel cell apparatus provided in each of a plurality of facilities is proposed (for example, Patent Literature 1). Specifically, a switch provided between the plurality of facilities is controlled such that output power of the fuel cell apparatus is interchanged between the plurality of facilities.

CITATION LIST

Patent Literature

Patent Literature 1: Japanese application publication No. 2016-152659

SUMMARY OF INVENTION

An energy management method according to a first aspect comprises a step A of outputting, by a fuel cell apparatus provided in each of a plurality of facilities, power using fuel, a step B of managing a storage amount of the fuel stored in a storage tank shared by the plurality of facilities, and a step C of allocating the storage amount of the fuel to each of the plurality of facilities.

An energy management apparatus according to a second aspect comprises a manager configured to manage a storage amount of fuel which is used in power generation by a fuel cell apparatus provided in each of a plurality of facilities and is stored in a storage tank shared by the plurality of facilities, and a controller configured to allocate the storage amount of the fuel to each of the plurality of facilities.

An energy management system according to a third aspect comprises a fuel cell apparatus provided in each of a plurality of facilities, a storage tank shared by the plurality of facilities, and an energy management apparatus configured to manage a storage amount of fuel stored in the storage tank. The energy management apparatus is configured to allocate the storage amount of the fuel to each of the plurality of facilities.

DESCRIPTION OF EMBODIMENTS

In a facility complex (for example, housing complex such as an apartment house) constituted by a plurality of facilities mentioned in the background art, a case in which a storage tank shared by a plurality of facilities is provided is considered. In such a case, when stagnation occurs in replenishment of fuel to the storage tank, or power outage occurs in a power grid, if the fuel (limited fuel) stored in the storage tank is arbitrarily used, a facility that saves the fuel and a facility that does not save the fuel are mixed, and thus there is a possibility of unfairness occurring between the plurality of facilities.

The present invention has been made to solve the above-described problem and provides an energy management method, an energy management apparatus, and an energy management system in which it is possible to secure fairness between a plurality of facilities. An embodiment will be described below with reference to the drawings. Regarding the following descriptions for the drawings, the same or similar reference signs are denoted by the same or similar components.

It should be noted that the drawings are schematic, and ratios and the like of dimensions may be different from actual ones. Thus, specific dimensions and the like should be determined in consideration of the following descriptions. In addition, it is noted that parts having different dimensional relationships or proportions between the drawings are included.

EMBODIMENT

Energy Management System

An energy management system according to an embodiment will be described below.

Figure 1:
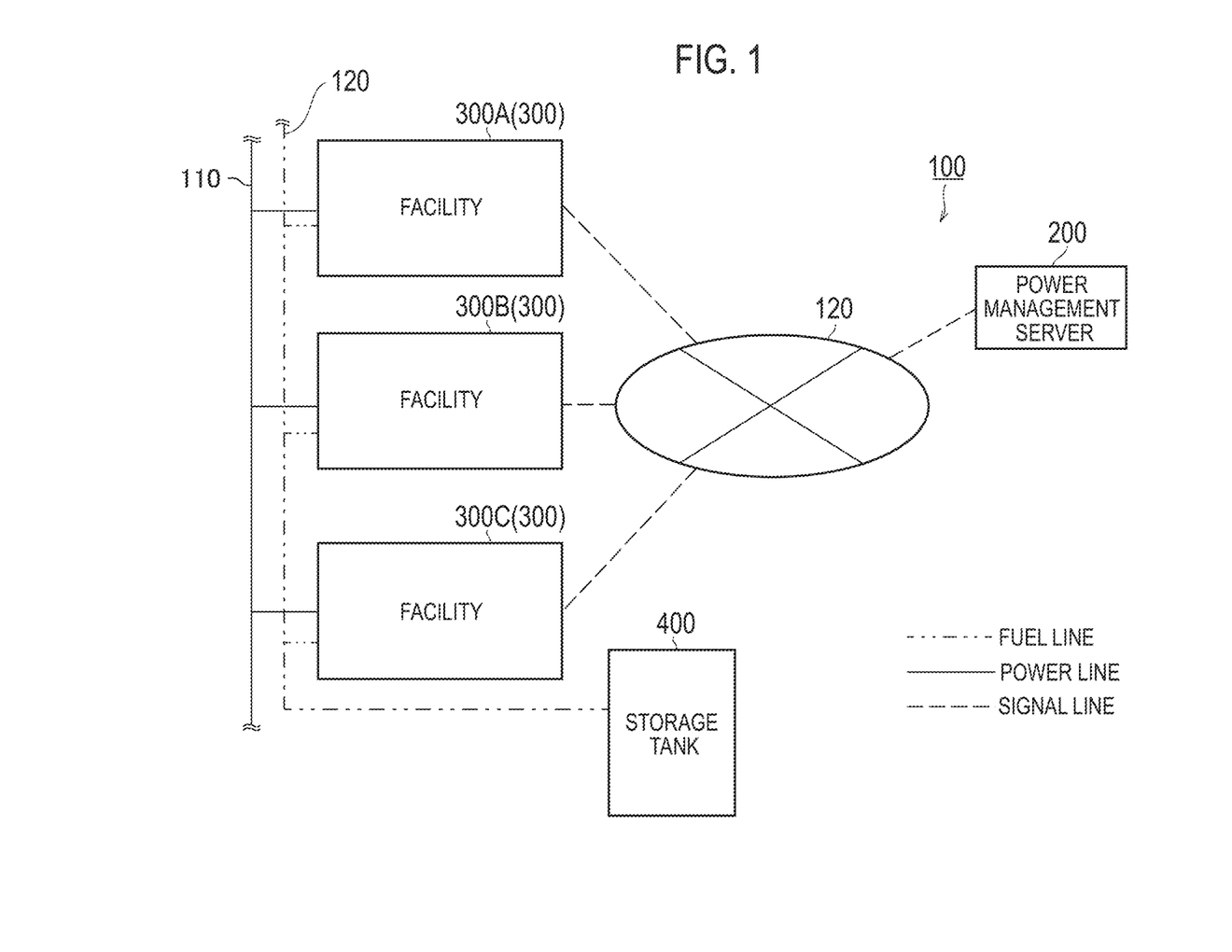
FIG. 1 is a diagram illustrating an energy management system 100 according to an embodiment.

As illustrated in FIG. 1, an energy management system 100 includes a power management server 200, a facility 300, and a storage tank 400. FIG. 1 illustrates a facility 300A to a facility 300C as the facility 300.

Each facility 300 is connected to a power grid 110. In the following descriptions, a flow of electric power from the power grid 110 to the facility 300 is referred to as a power flow, and a flow of electric power from the facility 300 to the power grid 110 is referred to as a reverse power flow.

The power management server 200 and the facility 300 are connected to a network 120. The network 120 may provide a line between the power management server 200 and the facility 300. For example, the Internet is provided as the network 120. The network 120 may provide a private line such as a virtual private network (VPN).

The power management server 200 is a server managed by a power company such as a power generation company, a power transmission and distribution company, or a retail company.

The power management server 200 transmits a control message of instructing a local control apparatus 360 provided in the facility 300 to control a distributed power supply (for example, solar cell apparatus, storage battery apparatus, and fuel cell apparatus) provided in the facility 300. For example, the power management server 200 may transmit a power flow control message (for example, demand response (DR)) of requesting control of a power flow or may transmit a reverse power flow control message of requesting control of a reverse power flow. Further, the power management server 200 may transmit a power supply control message of controlling an operation state of the distributed power supply. The control degree of the power flow or the reverse power flow may be represented by an absolute value (for example, ∘∘ kW) or a relative value (for example, ∘∘%). The control degree of the power flow or the reverse power flow may be represented by two levels or more. The control degree of the power flow or the reverse power flow may be represented by electricity rates (RTP: real time pricing) defined by the current power supply and demand balance or by electricity rates (TOU: time of use) defined by the previous power supply and demand balance.

Figure 2:
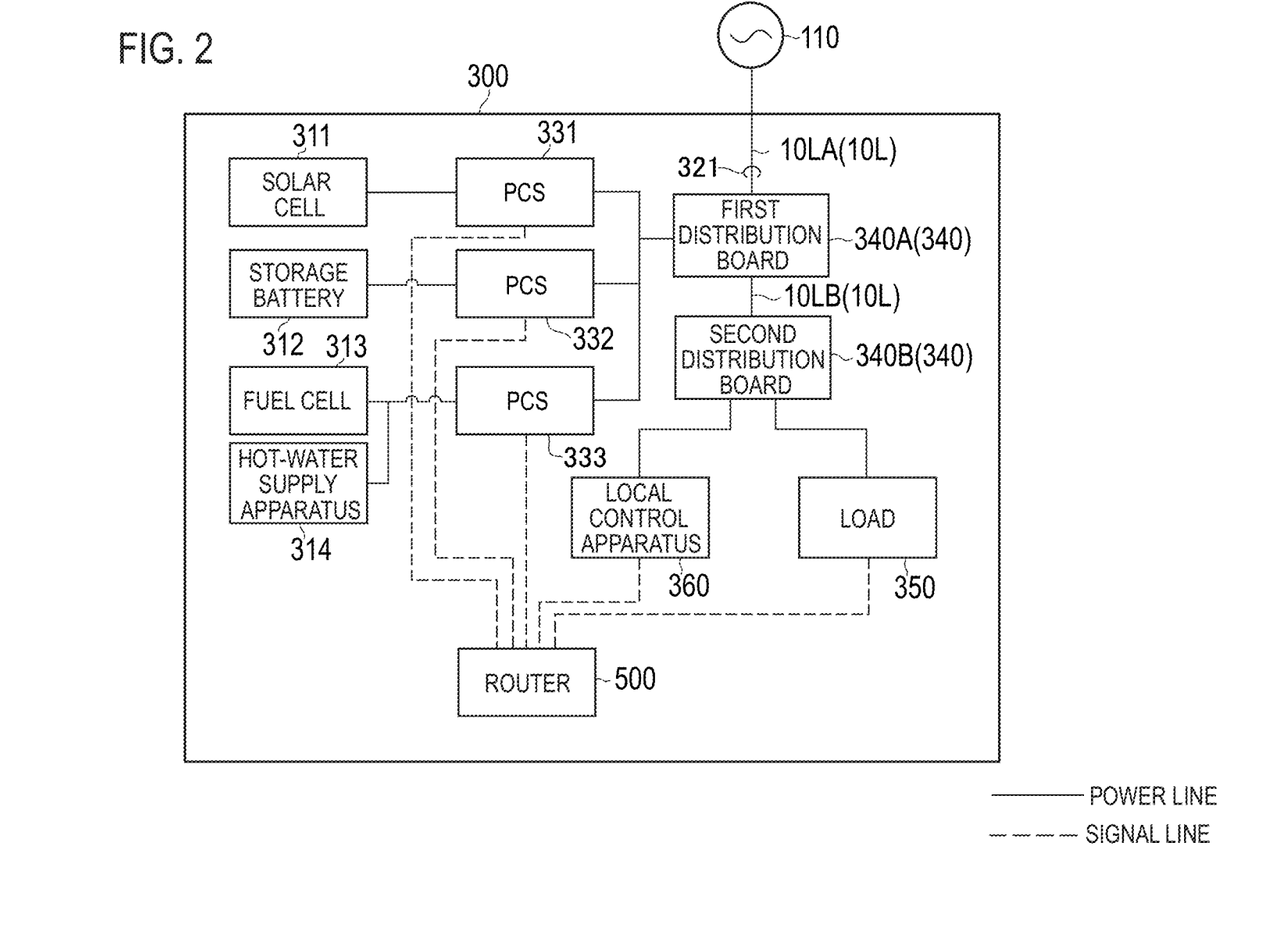
FIG. 2 is a diagram illustrating a facility 300 according to the embodiment.

As illustrated in FIG. 2, the facility 300 includes a router 500. The router 500 is connected to the power management server 200 via the network 120. The router 500 constitutes a local area network and is connected to each apparatus (for example, PCS 331, PCS 332, PCS 333, load 350 local control apparatus 360, and the like). In FIG. 2, a solid line indicates a power line, and a dotted line indicates a signal line. The embodiment is not limited thereto, and a signal may be transmitted in the power line (for example, power-line transmission communication).

The facility 300 includes a solar cell 311, a storage battery 312, a fuel cell 313, a hot-water supply apparatus 314, a PCS 331, a PCS 332, a PCS 333, a distribution board 340, a load 350, and the local control apparatus 360.

The solar cell 311 is an apparatus that generates power with receiving light. The solar cell 311 outputs generated DC power. The generated energy of the solar cell 311 changes depending on the quantity of solar radiation with which the solar cell 311 is irradiated.

The storage battery 312 is an apparatus that stores electric power. The storage battery 312 outputs stored DC power. The storage battery 312 may be a power supply used in a virtual power plant (VPP).

The fuel cell 313 is a cell that outputs electric power using fuel. As the fuel, for example, a material containing hydrogen or a material containing alcohol may be provided. In addition, as the fuel, a material such as city gas, propane gas, kerosene, ammonia, or coal gas may be provided. For example, as the fuel cell 313, any of a solid oxide fuel cell (SOFC), a polymer electrolyte fuel cell (PEFC), a phosphoric acid fuel cell (PAFC), and a molten carbonate fuel cell (MCFC) may be provided.

The hot-water supply apparatus 314 includes a hot-water storage tank. The hot-water supply apparatus 314 maintains or increases the amount of (hot) water stored in the hot-water storage tank or maintains or increases the temperature of (hot) water stored in the hot-water storage tank by using the waste heat of the fuel cell 313. Such control may be referred to as boiling of water stored in the hot-water storage tank.

The PCS 331 refers to a power conditioning system (PCS) connected to the solar cell 311. The PCS 331 converts DC power from the solar cell 311 into AC power.

The PCS 332 refers to a power conditioning system connected to the storage battery 312. The PCS 332 converts DC power from the storage battery 312 into AC power and converts AC power for the storage battery 312 into DC power.

The PCS 333 refers to a power conditioning system connected to the fuel cell 313. The PCS 333 converts DC power from the fuel cell 313 into AC power.

The distribution board 340 is connected to a main power line 10L. The distribution board 340 includes a first distribution board 340A and a second distribution board 340B. The first distribution board 340A is connected to a power grid 10 via a main power line 10LA. The first distribution board 340A is connected to the solar cell 311 via the PCS 331, is connected to the storage battery 312 via the PCS 332, and is connected to the fuel cell 313 via the PCS 333. The first distribution board 340A supplies electric power output from the PCS 331 to the PCS 333 and electric power supplied from the power grid 10, to the second distribution board 340B via a main power line 10LB. The second distribution board 340B distributes the electric power supplied via the main power line 10LB, to each of equipments (here, load 350 and local control apparatus 360).

The load 350 refers to an apparatus that consumes electric power supplied via the power line. For example, the load 350 includes apparatuses such as an air conditioner, a lighting apparatus, a refrigerator, and a television. The load 350 may include a single apparatus or a plurality of apparatuses.

The local control apparatus 360 is an apparatus (EMS: energy management system) that manages electric power information indicating electric power in the facility 300. The electric power in the facility 300 refers to electric power flowing in the facility 300, electric power purchased by the facility 300, or electric power sold from the facility 300. Thus, the local control apparatus 360 manages at least the PCS 331 to the PCS 333.

In the embodiment, the single solar cell 311 may be referred to as the solar cell apparatus, or the solar cell 311 and the PCS 331 may be referred to as the solar cell apparatus. The single fuel cell 313 may be referred to as the fuel cell apparatus. The fuel cell 313 and the PCS 333 may be referred to as the fuel cell apparatus. The fuel cell 313, the hot-water supply apparatus 314, and the PCS 333 may be referred to as the fuel cell apparatus. The single storage battery 312 may be referred to as the storage battery apparatus. The storage battery 312 and the PCS 332 may be referred to as the storage battery apparatus.

The storage tank 400 is a tank shared by the plurality of facilities 300 and a tank that stores the fuel. The fuel to be stored in the storage tank 400 may be regularly replenished by a fuel company or the like or may be replenished, if necessary, by the fuel company or the like. A timing at which the fuel is replenished may be scheduled.

In the embodiment, a communication between the power management server 200 and the local control apparatus 360 is performed in accordance with a first protocol. A communication between the local control apparatus 360 and the distributed power supply is performed in accordance with a second protocol different from the first protocol. As the first protocol, for example, a protocol based on Open ADR (automated demand response) (trademark) or an independent and dedicated protocol can be used. As the second protocol, for example, a protocol based on ECHONET Lite (registered trademark), SEP (Smart Energy Profile) 2.0, KNX, or an independent and dedicated protocol can be used. The first protocol and the second protocol may be different from each other. For example, even though both the first protocol and the second protocol are independent and dedicated protocols, the first protocol and the second protocol may be used so long as the first protocol and the second protocol are created with different rules.

Power Management Server

Figure 3:
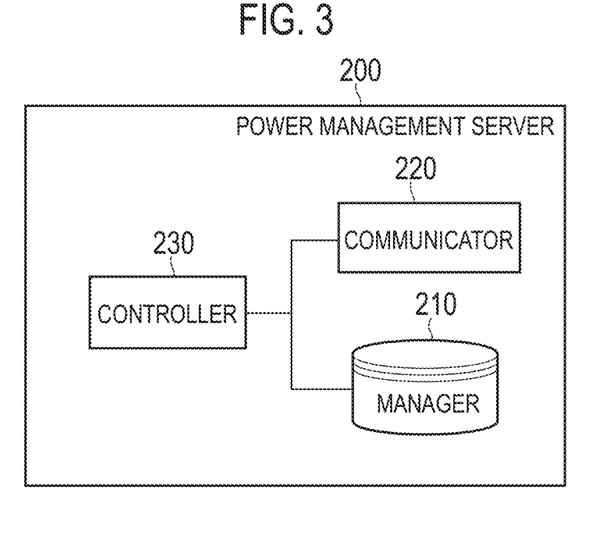
FIG. 3 is a diagram illustrating a power management server 200 according to the embodiment.

The power management server according to the embodiment will be described below. As illustrated in FIG. 3, the power management server 200 includes a manager 210, a communicator 220, and a controller 230. The power management server 200 is an example of a virtual top node (VTN).

The manager 210 is constituted by a non-volatile memory and/or a storage medium such as an HDD and manages data regarding the facility 300. As the data regarding the facility 300, for example, the type of the distributed power supply provided in the facility 300 and the specifications of the distributed power supply provided in the facility 300 are provided. The specifications may include rated output power of the PCS 331 connected to the solar cell 311, rated output power of the PCS 332 connected to the storage battery 312, rated output power of the PCS 333 connected to the fuel cell 313, and the like.

In the embodiment, the manager 210 manages at least the storage amount of the fuel stored in the storage tank 400. The manager 210 may update the storage amount by storage amount data received from the storage tank 400. The storage amount data may be data indicating an increased amount (replenished amount) of the fuel, data indicating a reduced amount (used amount) of the fuel, or data indicating the storage amount itself of the fuel. The data indicating the reduced amount (used amount) of the fuel may be received from the local control apparatus 360.

The manager 310 may manage the remaining charge of the storage battery (storage battery apparatus) 313. The manager 210 may update the remaining charge by remaining charge data received from the local control apparatus 360. The remaining charge data may be data indicating an increased amount (charged amount) of the remaining charge, data indicating a reduced amount (discharged amount) of the remaining charge, or data indicating the remaining charge itself.

The communicator 220 is constituted by a communication module and communicates with the local control apparatus 360 via the network 120. As described above, the communicator 220 performs communication in accordance with the first protocol. For example, the communicator 220 transmits a first message to the local control apparatus 360 in accordance with the first protocol. The communicator 220 receives a first message response from the local control apparatus 360 in accordance with the first protocol.

The controller 230 is constituted by a memory, a CPU, and the like and controls the components of the power management server 200. For example, the controller 230 transmits a control message to instruct the local control apparatus 360 provided in the facility 300 to control the distributed power supply provided in the facility 300. As described above, the control message may be a power flow control message, a reverse power flow control message, or a power supply control message.

In the embodiment, the controller 230 allocates the storage amount of the fuel to each of the plurality of facilities 300 in a predetermined period. The predetermined period may be at least one of a period in which stagnation occurs in replenishment of the fuel to the storage tank 400 and a period in which power outage occurs in the plurality of facilities 300.

Here, the stagnation in replenishment of the fuel to the storage tank 400 may occur by a trouble of the fuel company or by a disaster. The power outage occurring in the plurality of facilities 300 may be power outage caused by a trouble of an electric power company or be power outage caused by a disaster.

The storage amount may be allocated to each of the plurality of facilities 300 in a manner as follows. In the following descriptions, a case in which, for example, three facilities 300 are provided as illustrated in FIG. 1 will be described as an example.

(i) First Allocation Method

The controller 230 may allocate the storage amount of the fuel such that the amount of fuel allocated to each facility 300 becomes even. In such a case, the controller 230 allocates the storage amount of the fuel in accordance with the following expression, for example.

$$\text{Allocation Amount of Facility } 300A = \tfrac{1}{3} \times X$$

$$\text{Allocation Amount of Facility } 300B = \tfrac{1}{3} \times X$$

$$\text{Allocation Amount of Facility } 300C = \tfrac{1}{3} \times X \quad \text{[Expression 1]}$$

According to the first allocation method, it is possible to cause the output electric energy of the fuel cell apparatus to become uniform between the plurality of facilities 300. The first allocation method is useful in a case where the output power of the fuel cell apparatus provided in the facility 300 can be controlled. In such a case, since the output power of the fuel cell apparatus in each facility 300 is controlled to have a predetermined value, it is possible to cause the output electric energy of the fuel cell apparatus to become uniform between the plurality of facilities 300, and to cause an output time of the fuel cell apparatus to become uniform between the plurality of facilities 300.

(ii) Second Allocation Method

The controller 230 may allocate the storage amount of the fuel based on a history of power consumption of each of the plurality of facilities 300. For example, the controller 230 may allocate the storage amount more than that for the facility 300 having relatively small power consumption, to the facility 300 having relatively large power consumption.

Specifically, considered is a case where an average value of power consumption of the facility 300A is $A_2$ (kW), an average value of power consumption of the facility 300B is $B_2$ (kW), an average value of power consumption of the facility 300C is $C_2$ (kW), and the storage amount of the storage tank 400 is $X$ (m$^3$). In such a case, the controller 230 allocates the storage amount of the fuel in accordance with the following expression, for example.

$$\text{Allocation Amount of Facility } 300A = \frac{A_2}{A_2 + B_2 + C_2} \times X \quad \text{[Expression 2]}$$

$$\text{Allocation Amount of Facility } 300B = \frac{B_2}{A_2 + B_2 + C_2} \times X$$

$$\text{Allocation Amount of Facility } 300C = \frac{C_2}{A_2 + B_2 + C_2} \times X$$

According to the second allocation method, since the history of power consumption is considered, it is possible to reduce an influence on a user before and after a start of the predetermined period.

(iii) Third Allocation Method

The controller 230 may allocate the storage amount of the fuel based on rated output power of the fuel cell apparatus provided in each of the plurality of facilities 300. For example, the controller 230 may allocate the storage amount more than that for the facility 300 including the fuel cell apparatus having relatively small rated output power, to the facility 300 including the fuel cell apparatus having relatively large rated output power.

Specifically, considered is a case where rated output power of the fuel cell apparatus in the facility 300A is $A_3$ (kW), rated output power of the fuel cell apparatus in the facility 300B is $B_3$ (kW), rated output power of the fuel cell apparatus in the facility 300C is $C_3$ (kW), and the storage amount of the storage tank 400 is X (m³). In such a case, the controller 230 allocates the storage amount of the fuel in accordance with the following expression, for example.

$$\text{Allocation Amount of Facility } 300A = \frac{A_3}{A_3 + B_3 + C_3} \times X \quad \text{[Expression 3]}$$

$$\text{Allocation Amount of Facility } 300B = \frac{B_3}{A_3 + B_3 + C_3} \times X$$

$$\text{Allocation Amount of Facility } 300C = \frac{C_3}{A_3 + B_3 + C_3} \times X$$

According to the third allocation method, in a case where the fuel cell apparatus provided in the facility 300 is configured to output rate power, it is possible to cause the output time of the fuel cell apparatus to become uniform between the plurality of facilities 300.

(iv) Fourth Allocation Method

The controller 230 may allocate the storage amount of the fuel based on the remaining charge of the storage battery apparatus provided in one or more facilities 300 among the plurality of facilities 300. For example, the controller 230 may allocate the storage amount more than that for the facility 300 including the storage battery apparatus having a relatively large remaining charge, to the facility 300 including the storage battery apparatus having a relatively small remaining charge.

Specifically, considered is a case where the remaining charge of the storage battery apparatus in the facility 300A is $A_4$ (kWh), the remaining charge of the storage battery apparatus in the facility 300B is $B_4$ (kWh), the remaining charge of the storage battery apparatus in the facility 300C is $C_4$ (kWh), and the storage amount of the storage tank 400 is X (m³). In such a case, the controller 230 allocates the storage amount of the fuel in accordance with the following expression, for example.

$$\text{Allocation Amount of Facility } 300A = \quad \text{[Expression 4]}$$

$$\frac{\frac{1}{A_4}}{\frac{1}{A_4} + \frac{1}{B_4} + \frac{1}{C_4}} \times X$$

$$\text{Allocation Amount of Facility } 300B =$$

$$\frac{\frac{1}{B_4}}{\frac{1}{A_4} + \frac{1}{B_4} + \frac{1}{C_4}} \times X$$

$$\text{Allocation Amount of Facility } 300C =$$

$$\frac{\frac{1}{C_4}}{\frac{1}{A_4} + \frac{1}{B_4} + \frac{1}{C_4}} \times X$$

Here, regarding the facility 300 in which the remaining charge of the storage battery apparatus is zero or the facility 300 which does not include the storage battery apparatus, a constant (integer larger than zero) may be substituted instead of the inverse of the remaining charge. Such a constant may be determined in accordance with the remaining charge of the storage battery apparatus provided in other facilities 300.

According to the fourth allocation method, since the remaining charge of the storage battery apparatus is considered, it is possible to reduce the sense of unfairness between the plurality of facilities 300 in terms of electric power output from both the fuel cell apparatus and the storage battery apparatus.

(v) Fifth Allocation Method

The controller 230 may allocate the storage amount of the fuel based on the power generation prediction amount of the solar cell apparatus provided in one or more facilities 300 among the plurality of facilities 300. For example, the controller 230 may allocate the storage amount more than that for the facility 300 including the solar cell apparatus having a relatively large power generation prediction amount, to the facility 300 including the solar cell apparatus having a relatively small power generation prediction amount.

Here, the power generation prediction amount refers to electric energy having a possibility of the solar cell apparatus generating electric power in a calculation target period. The calculation target period may be equal to or shorter than the predetermined period. The power generation prediction amount may be calculated based on rated generated power of the solar cell apparatus. The power generation prediction amount may be calculated based on the rated generated power of the solar cell apparatus and meteorological data (quantity of solar radiation).

Specifically, considered is a case where the power generation prediction amount of the solar cell apparatus in the facility 300A is $A_5$ (kWh), the power generation prediction amount of the solar cell apparatus in the facility 300B is $B_5$ (kWh), the power generation prediction amount of the solar cell apparatus in the facility 300C is $C_5$ (kWh), and the storage amount of the storage tank 400 is X (m³). In such a case, the controller 230 allocates the storage amount of the fuel in accordance with the following expression, for example.

$$\text{Allocation Amount of Facility } 300A = \quad \text{[Expression 5]}$$

$$\frac{\frac{1}{A_5}}{\frac{1}{A_5} + \frac{1}{B_5} + \frac{1}{C_5}} \times X$$

$$\text{Allocation Amount of Facility } 300B =$$

$$\frac{\frac{1}{B_5}}{\frac{1}{A_5} + \frac{1}{B_5} + \frac{1}{C_5}} \times X$$

$$\text{Allocation Amount of Facility } 300C =$$

$$\frac{\frac{1}{C_5}}{\frac{1}{A_5} + \frac{1}{B_5} + \frac{1}{C_5}} \times X$$

Here, regarding the facility 300 in which the power generation prediction amount of the solar cell apparatus is zero or the facility 300 which does not include the solar cell apparatus, a constant (integer larger than zero) may be substituted instead of the inverse of the power generation prediction amount. Such a constant may be determined in accordance with the power generation prediction amount of the solar cell apparatus provided in other facilities 300.

According to the fifth allocation method, since the power generation prediction amount of the solar cell apparatus is considered, it is possible to reduce the sense of unfairness between the plurality of facilities 300 in terms of electric power output from both the fuel cell apparatus and the solar cell apparatus.

(vi) Sixth Allocation Method

The controller 230 may allocate the storage amount of the fuel based on a timing at which replenishment of the fuel to the storage tank 400 is resumed (hereinafter, resuming timing). For example, the controller 230 may allocate the storage amount of the fuel such that the total output power of the distributed power supply becomes even between the facilities 300 in a period from an allocation timing of the storage amount to the resuming timing (hereinafter, fuel replenishment stagnation period).

The sixth allocation method is a method considering the resuming timing in a combination of the fourth allocation method and the fifth allocation method. Here, in the sixth allocation method, the calculation target period used in the fifth allocation method corresponds to the fuel replenishment stagnation period.

The sixth allocation method is useful in a case in which the fuel replenishment stagnation period is long (for example, one week). That is, in the case in which the fuel replenishment stagnation period is long, the remaining charge of the storage battery apparatus is reduced, but the power generation of the solar cell apparatus continues so long as light receiving is possible. Focusing on this point, the resuming timing is considered in the sixth allocation method.

Local Control Apparatus

Figure 4:
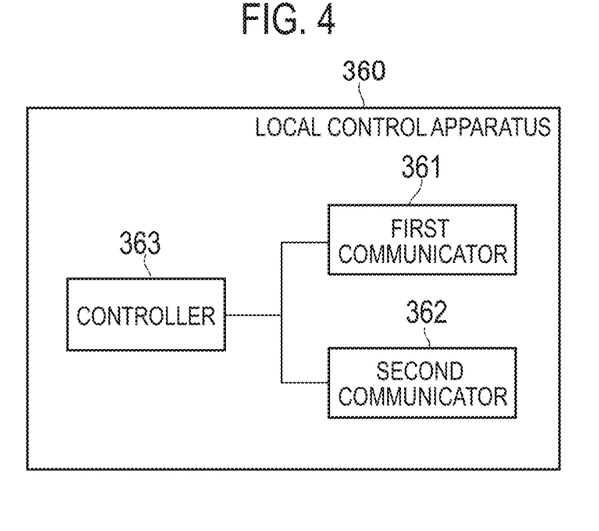
FIG. 4 is a diagram illustrating a local control apparatus 360 according to the embodiment.

The local control apparatus according to the embodiment will be described below. As illustrated in FIG. 4, the local control apparatus 360 includes a first communicator 361, a second communicator 362, and a controller 363. The local control apparatus 360 is an example of a virtual end node (VEN).

The first communicator 361 is constituted by a communication module and communicates with the power management server 200 via the network 120. As described above, the first communicator 361 performs communication in accordance with the first protocol. For example, the first communicator 361 receives the first message from the power management server 200 in accordance with the first protocol. The first communicator 361 transmits the first message response to the power management server 200 in accordance with the first protocol.

The second communicator 362 is constituted by a communication module and communicates with the distributed power supply (for example, PCS 331 to PCS 333). As described above, the second communicator 362 performs communication in accordance with the second protocol. For example, the second communicator 362 transmits a second message to the distributed power supply in accordance with the second protocol. The second communicator 362 receives a second message response from the distributed power supply in accordance with the second protocol.

The controller 363 is constituted by a memory, a CPU, and the like and controls the components of the local control apparatus 360. Specifically, in order to control electric power of the facility 300, the controller 363 transmits the second message and receives the second message response so as to instruct the equipment to set the operation state of the distributed power supply. In order to manage electric power of the facility 300, the controller 363 may transmit the second message and receive the second message response so as to instruct the distributed power supply to report information of the distributed power supply.

Energy Management Method

The energy management method according to the embodiment will be described below. An operation of the power management server 200 will be described below.

Figure 5:
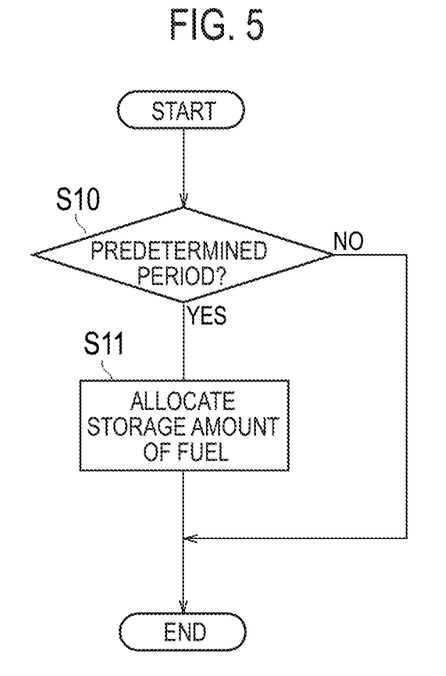
FIG. 5 is a diagram illustrating an energy management method according to the embodiment.

As illustrated in FIG. 5, in Step S10, the power management server 200 determines whether or not the current time point is in the predetermined period. In other words, the power management server 200 determines whether or not stagnation occurs in replenishment of the fuel to the storage tank 400 and whether or not power outage occurs in the plurality of facilities 300. In a case where the current time point is in the predetermined period, the power management server 300 performs the process of Step S11. In a case where the current time point is not in the predetermined period, the power management server 300 ends a series of processes.

In Step S11, the power management server 200 allocates the storage amount of the fuel to each of the plurality of facilities 300. For example, any of the first allocation method to the sixth allocation method described above is provided as a method of allocating the storage amount.

Actions and Advantageous Effects

In the embodiment, the power management server 200 allocates the storage amount of the fuel to each of the plurality of facilities 300 in the predetermined period. The predetermined period may be at least one of a period in which stagnation occurs in replenishment of the fuel to the storage tank 400 and a period in which power outage occurs in the plurality of facilities 300. Thus, it is possible to suppress an occurrence of a situation in which the fuel is arbitrarily used by the facility 300 in such a predetermined period and to secure fairness between the plurality of facilities 300.

Modification Example 1

Modification Example 1 of the embodiment will be described below. Descriptions will be made below focusing on differences from the embodiment.

In Modification Example 1, a fuel cell apparatus provided in each of a plurality of facilities 300 outputs electric power based on a storage amount allocated by a power management server 200. For example, the fuel cell apparatus in each facility 300 controls the output power to have a predetermined value in a case where the storage amount is allocated by the above-described first allocation method. The fuel cell apparatus in each facility 300 controls the output power to be rate power in a case where the storage amount is allocated by the above-described third allocation method.

Other Embodiments

Although the present invention has been described by the above-described embodiment, it should not be understood that the descriptions and the drawings that form a part of this disclosure limit the present invention. Various alternative embodiments, examples, and operation techniques will be apparent to those skilled in the art from this disclosure.

In the embodiment, a case where the power management server 200 is an energy management apparatus that allocates the storage amount of the fuel stored in the storage tank 400 is exemplified. However, the embodiment is not limited thereto. For example, the energy management apparatus may correspond to one or more local control apparatuses 360 provided in the plurality of facilities 300. The energy management apparatus may be a server or an apparatus provided separately from the power management server 200. Such a server or an apparatus may be managed by the fuel company or by other companies.

Although not particularly mentioned in the embodiment, the local control apparatus 360 to be provided in the facility 300 may not necessarily be provided in the facility 300. For example, some of the functions of the local control apparatus 360 may be provided by a cloud server provided on the Internet. That is, it may be considered that the local control apparatus 360 includes the cloud server.

Although not particularly mentioned in the embodiment, power generation efficiency of the fuel cell apparatus may be considered in a method of allocating the storage amount of the fuel (first allocation method to sixth allocation method). In such a case, the power management server 200 may allocate the storage amount more than that for the facility 300 including the fuel cell apparatus having relatively high power generation efficiency, to the facility 300 including the fuel cell apparatus having relatively low power generation efficiency.

Although not particularly mentioned in the embodiment, priority of allocating the storage amount of the fuel may be determined by the type of the facility 300. For example, a case where a hospital, a corner store, and a bookstore are provided as the plurality of facilities 300 is considered. In such a case, first priority being the highest may be assigned to the hospital, second priority lower than the first priority may be assigned to the corner store, and third priority lower than the second priority may be assigned to the bookstore. As the priority becomes higher, the allocated amount of the storage amount of the fuel increases. The high priority is assigned to the facility 300 having a high degree of urgency. Thus, it is possible to allocate the large storage amount of the fuel to the facility 300 having a high degree of urgency.

In the embodiment, a case where the first protocol is a protocol based on OpenADR2.0, and the second protocol is a protocol based on ECHONET Lite is exemplified. However, the embodiment is not limited thereto. As the first protocol, a protocol standardized as a protocol used in communication between the power management server 200 and the local control apparatus 360 may be provided. As the second protocol, a protocol standardized as a protocol used in the facility 300 may be provided.

The entire content of Japanese Patent Application No. 2017-064450 (filed on Mar. 29, 2017) is incorporated herein by reference.

The invention claimed is:

1. An energy management method, comprising:
outputting, by a fuel cell apparatus provided in each of a plurality of facilities, power using fuel;
managing, by a power management server, a storage amount of the fuel stored in a storage tank shared by the plurality of facilities;
allocating, by the power management server, the storage amount of the fuel to each of the plurality of facilities in a predetermined period, wherein the predetermined period includes a period in which a stagnation occurs in replenishment of the fuel to the storage tank by a trouble of a fuel company or a disaster; and
transmitting, by the power management server, a control message to a local control apparatus in each of the plurality of facilities, to control the output power from the corresponding fuel cell apparatus after the allocating the storage amount of the fuel to each of the plurality of facilities,
wherein the control message is communicated using a first protocol, wherein the fuel cell apparatus communicates with its corresponding local control apparatus in the corresponding facility using a second protocol which is different than the first protocol.

2. The energy management method according to claim 1, wherein the allocating includes allocating the storage amount of the fuel based on a history of power consumption of each of the plurality of facilities.

3. The energy management method according to claim 1, wherein the allocating includes allocating the storage amount of the fuel based on rated output power of the fuel cell apparatus provided in each of the plurality of facilities.

4. The energy management method according to claim 1, wherein the allocating includes allocating the storage amount of the fuel based on a remaining charge of a storage battery apparatus provided in one or more facilities among the plurality of facilities.

5. The energy management method according to claim 1, wherein the allocating includes allocating the storage amount of the fuel based on a power generation prediction amount of a solar cell apparatus provided in one or more facilities among the plurality of facilities.

6. The energy management method according to claim 1, wherein the allocating includes allocating the storage amount of the fuel based on a timing at which the replenishment of the fuel to the storage tank resumes.

7. The energy management method according to claim 1, wherein the allocating includes evenly allocating the storage amount of the fuel.

8. The energy management method according to claim 1, wherein the outputting includes outputting the power by the fuel cell apparatus provided in each of the plurality of facilities, based on the storage amount allocated in the allocating.

9. An energy management apparatus, comprising:
a manager, comprising a memory, configured to manage a storage amount of fuel which is used in power generation by a fuel cell apparatus provided in each of a plurality of facilities and is stored in a storage tank shared by the plurality of facilities; and
a controller configured to allocate the storage amount of the fuel to each of the plurality of facilities in a predetermined period, wherein the predetermined period includes a period in which a stagnation occurs in replenishment of the fuel to the storage tank by a trouble of a fuel company or a disaster,
wherein the controller is configured to transmit a control message to a local control apparatus in each of the plurality of facilities, to control the power generation by the fuel cell apparatus provided in each of the plurality of facilities after the storage amount of the fuel is allocated,
wherein the control message is communicated using a first protocol, wherein the fuel cell apparatus is configured to communicate with its corresponding local control apparatus in the corresponding facility using a second protocol which is different than the first protocol.

10. An energy management system, comprising:
a fuel cell apparatus provided in each of a plurality of facilities;
a storage tank shared by the plurality of facilities; and an energy management apparatus, comprising a controller and a manager, configured to manage a storage amount of fuel stored in the storage tank, wherein the energy management apparatus is configured to allocate the storage amount of the fuel to each of the plurality of facilities in a predetermined period, and the predetermined period includes a period in which a stagnation occurs in replenishment of the fuel to the storage tank by a trouble of a fuel company or a disaster, wherein the energy management apparatus is configured to transmit a control message to a local control apparatus in each of the plurality of facilities, to control power generation by the fuel cell apparatus provided in each of the plurality of facilities after the storage amount of the fuel is allocated, wherein the control message is communicated using a first protocol, wherein the fuel cell apparatus is configured to communicate with its corresponding local control apparatus in the corresponding facility using a second protocol which is different than the first protocol.

11. The energy management system according to claim 10, wherein the energy management apparatus is configured to allocate the storage amount of the fuel based on a remaining charge of a storage battery apparatus provided in one or more facilities among the plurality of facilities.

12. The energy management method according to claim 1, further comprising:
determining whether or not a current time point is in the predetermined period, wherein
in response to determining that the current time point is in the predetermined period, the allocating is performed, and
in response to determining that the current time point is not in the predetermined period, the allocating is not performed.

13. The energy management method according to claim 1, further comprising:
determining whether or not the stagnation occurs in a current time point that is in the predetermined period, wherein
in response to determining that the stagnation occurs in the current time point, the allocating is performed, and
in response to determining that the stagnation does not occur in the current time point, the allocating is not performed.

14. The energy management apparatus according to claim 9, wherein
the controller is further configured to determine whether or not a current time point is in the predetermined period, wherein
in response to determining that the current time point is in the predetermined period, the controller is configured to allocate the storage amount of the fuel to each of the plurality of facilities, and
in response to determining that the current time point is not in the predetermined period, the controller is not configured to allocate the storage amount of the fuel to each of the plurality of facilities.

15. The energy management system according to claim 10, wherein
the energy management apparatus is further configured to determine whether or not a current time point is in the predetermined period, wherein
in response to determining that the current time point is in the predetermined period, the energy management apparatus is configured to allocate the storage amount of the fuel to each of the plurality of facilities, and
in response to determining that the current time point is not in the predetermined period, the energy management apparatus is not configured to allocate the storage amount of the fuel to each of the plurality of facilities.

\* \* \* \* \*